United States Patent [19]
Potgieter et al.

[11] 3,724,731
[45] Apr. 3, 1973

[54] SPARE-WHEEL CARRIERS FOR VEHICLES

[75] Inventors: Marilyn Jean Potgieter; Maurice Stephen Potgieter, both of Randburg, Republic of South Africa

[73] Assignee: Wheel Carrier Holdings (Proprietary) Limited

[22] Filed: Mar. 3, 1971

[21] Appl. No.: 120,622

[30] Foreign Application Priority Data

Mar. 4, 1970 South Africa..................70/1448

[52] U.S. Cl..........................224/42.23, 224/42.24
[51] Int. Cl. ..........................................B62d 43/00
[58] Field of Search ........214/454; 224/42.12, 42.23, 224/42.24, 42.13, 42.21

[56] References Cited

UNITED STATES PATENTS

| 2,420,854 | 5/1947 | Black | 224/42.23 |
| 2,931,549 | 4/1960 | Adkins | 224/42.24 |

FOREIGN PATENTS OR APPLICATIONS

| 891,171 | 3/1962 | Great Britain | 224/42.12 |

Primary Examiner—Gerald M. Forlenza
Assistant Examiner—Jerold M. Forsberg
Attorney—Waters, Roditi, Schwartz & Nissen

[57] ABSTRACT

A vehicle spare wheel carrier comprising a plate adapted to be suspended from the chassis of the vehicle and provided with a fixed hook and a movable hook. The periphery of the central opening in the wheel is engaged with the fixed hook and the wheel is then pivoted about the fixed hook until the periphery of the central opening clicks into engagement with the movable hook to support the wheel from the plate. The movable hook is guided for rectilinear movement towards and away from the fixed hook to facilitate positive engagement of the periphery of the central opening with the movable hook. A handle is provided on the movable hook to facilitate disengagement of the movable hook with the periphery of the central opening when the wheel is to be removed from the carrier and to manipulate the movable hook in case it does not properly engage the periphery of the central opening.

4 Claims, 7 Drawing Figures

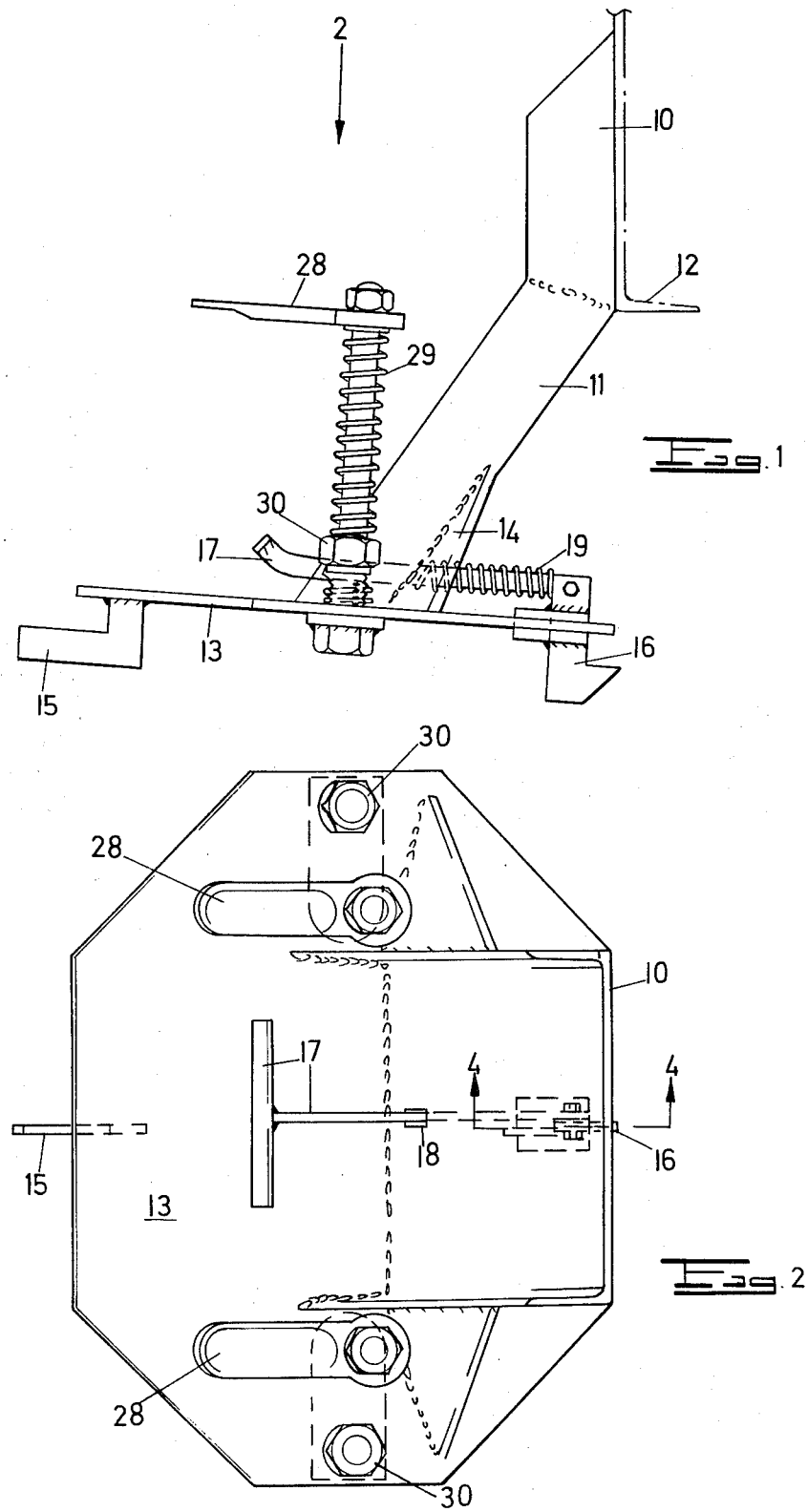

SPARE-WHEEL CARRIERS FOR VEHICLES

This invention relates to spare wheel carriers for vehicles.

The wheels of heavy duty vehicles or trucks generally weigh more than 100 kilograms and can easily weigh twice that. The changing of such a wheel, in the event of a blowout or puncture, is consequently a cumbersome and laborious procedure. More often than not at least two persons are required to perform the operation.

It is an object of the present invention to provide a vehicle spare wheel carrier on which a wheel may be easily mounted without substantial risk of injury to a person performing the operation.

A vehicle spare wheel carrier according to the invention comprises a body having means whereby it can be mounted in a suitable position on the chassis of a vehicle, a fixed hook member on the body, a movable hook member on the body guided for rectilinear movement towards and away from the fixed hook member, means biasing the movable hook member away from the fixed hook member, and handle means on the movable hook member, terminating at a point remote from the movable hook member the two hook members being so located that the periphery of the central opening of a vehicle wheel can be engaged with the fixed hook member and the wheel can then be pivoted about the fixed hook member until the periphery of the central opening of the wheel is engaged by the movable hook member.

The invention is further provided with at least one U-shaped element having one long limb and one short limb mounted on the body, the long limb passing through a first opening in the body and having an operating handle on the free end thereof, and the short limb being adapted to be manipulated by means of the operating handle until it passes through one of the bolt holes in the wheel and a second opening in the body to hold the wheel in position on the body.

Further according to the invention the long limb of the U-shaped element is movable in the first opening to enable the short limb to be moved out of the way while the wheel is being positioned on the body.

Further according to the invention spring means is provided on the long limb between the operating handle and the body to bias the short limb into engagement with the second opening.

Further according to the invention the free end of the short limb is threaded to receive a locking nut.

To illustrate the invention an embodiment thereof is described hereunder with reference to the accompanying drawings in which:

FIG. 1 is a side elevation of a wheel carrier according to the invention;

FIG. 2 is a plan view of FIG. 1 looking in the direction of the arrow 2 in FIG. 1;

Figure 3:
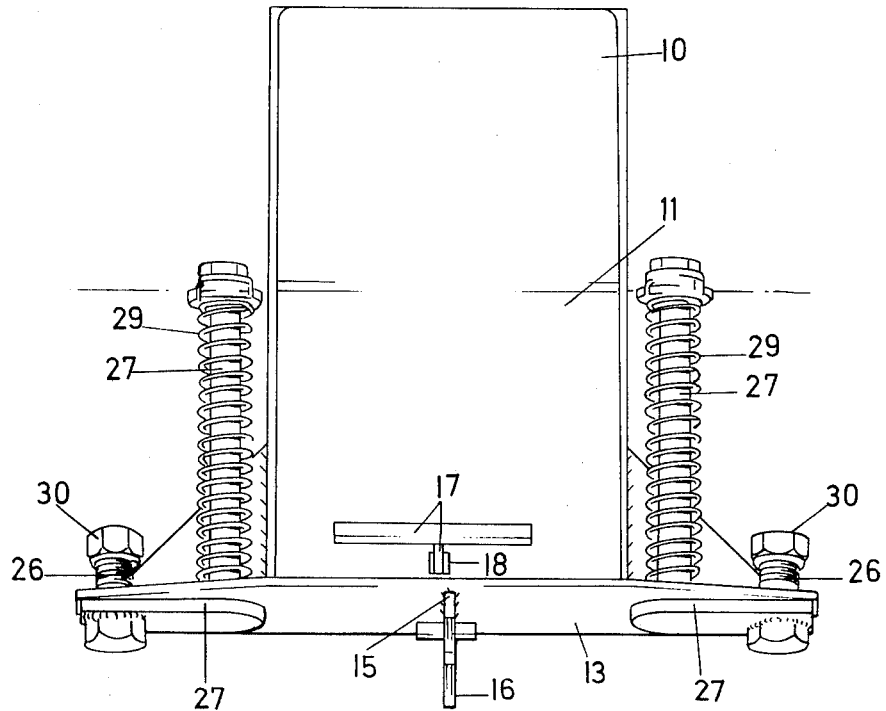
FIG. 3 is an end elevation of the carrier looking in the direction of the arrow 3 in FIG. 2.
Figure 4:
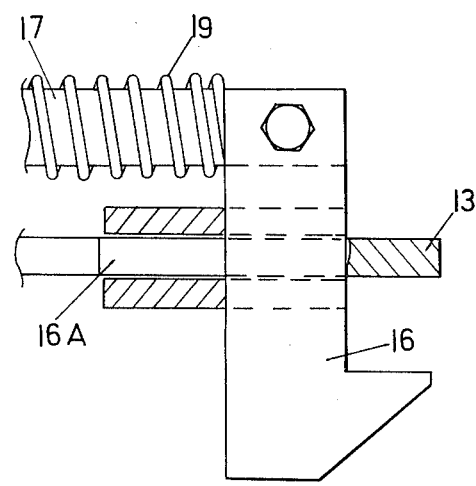
FIG. 4 is a sectional elevation of the movable hook along the line 4 — 4 in FIG. 2.

With reference to FIGS. 1 to 4 thereon is seen a wheel carrier comprising a body or carrier plate 13 with means whereby it can be mounted on the chassis of a vehicle. Such means comprises two short lengths of rolled steel channel 10 and 11 welded together so that they subtend between them an obtuse angle. The portion 11 is welded at the lower end thereof to the carrier plate 13 while the portion 10 is adapted to be fixed vertically (by welding or other means) to the chassis 12 of a vehicle.

The carrier plate 13 is stiffened by means of gussets 14 welded to the plate and to the portion 11.

A fixed hook 15 is welded to the lower face of the carrier plate 13, projecting beyond the edge thereof opposite the edge of the plate adjacent the chassis. Near this latter edge of the plate a wedge-shaped second hook 16 is mounted on the plate. This hook 16 slides in a slot 16A in the plate 13 aligned with the fixed hook 15. A handle 17 is attached to the second hook 16 and it projects through a hole 18 in the channel 11 away from the chassis 12. This handle 17 enables the second hook 16 to be pulled towards the fixed hook 15. A compression spring 19 is mounted on the handle 17 between the second hook 16 and the channel 11, the spring biasing the second hook 16 away from the fixed hook 15.

Figure 5:
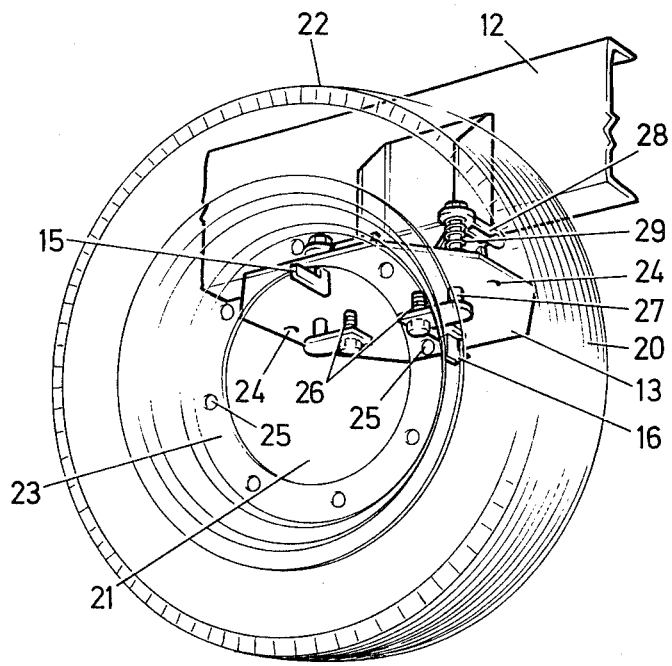
FIGS. 5 to 7 illustrate the procedure of mounting a wheel on the carrier.
Figure 6:
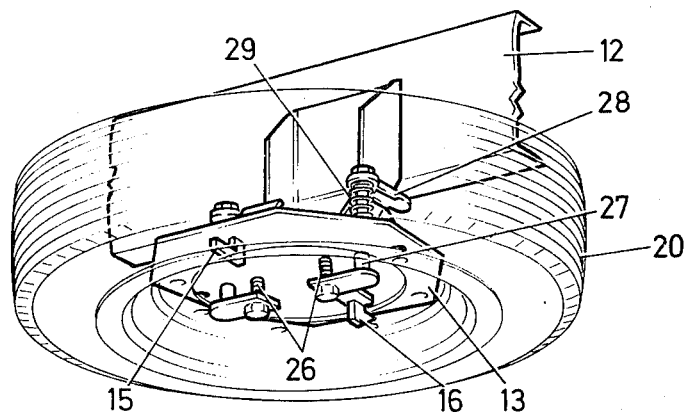
Figure 7:
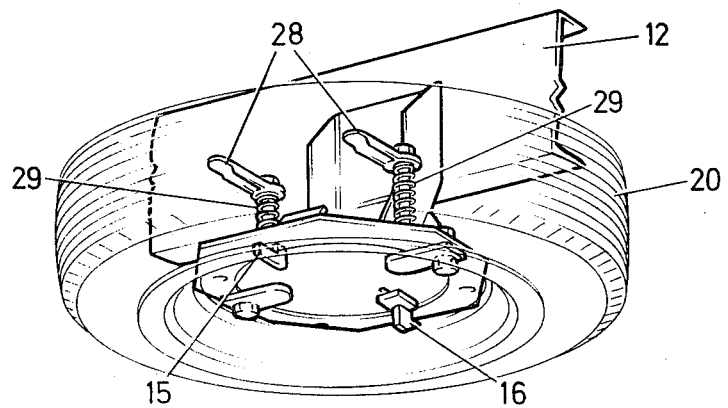

The use of the carrier and the procedure for mounting a wheel thereon is fully illustrated in FIGS. 5 to 7 in which the wheel is shown in ghosted lines to facilitate explanation.

The channel 11, 12 is of such a length that with the spare wheel 20 in a vertical position, the fixed hook 15 can hook under the rim of the hole 21 at the center of the wheel when the wheel is on the ground. The operator then applies his weight to the upper edge 22 of the wheel projecting away from the chassis 12. This causes the wheel to pivot about the hook 15 until the hub 23 of the wheel is flush against the carrier plate 13. During this pivotal movement the inner rim of the hole 21 in the wheel strikes the sloping surface of the wedge-shaped second hook 16. This causes the hook 16 to be driven back towards the fixed hook 15 in a straight line until it clears the rim. The rim passes the hook 16 which then clicks back into position under the action of the spring 19, the two hooks 15 and 16 thus holding the wheel in position against the carrier plate 13. To release the wheel, the second hook 16 is drawn back by the handle 17 and the wheel 20 is released and pivots downwardly about the fixed hook 15 under its own weight.

Although the wheel can safely be supported by means of the two hooks 15 and 16, additional locking means are provided for use during transport. To this end two bolt holes 24 are formed in the plate (See FIG. 5). The distance between these two holes 24 is arranged to be the same as the distance between diametrically opposite bolt holes 25 in the hub 23 of the wheel. The additional locking means consist basically of two studs 26. These two studs 26 are freely movable in the bolt holes 25 and 24 of the wheel and carrier plate and project therethrough from below. Each stud 26 is welded to an L-shaped bracket 27, the upright of the L projecting upwardly through the carrier plate, and the base of the L joining the lower end of the stud to the lower end of the upright below the carrier plate. Thus the additional locking means comprises two U-shaped elements each having a short limb formed by stud 26, a longer limb formed by the upright of L- shaped bracket 27 and a web formed by the base of the L-shaped bracket. The U-shaped elements are axially slidable on their mountings on the carrier plate between positions in which the short limbs project through the bolt holes 25 and 24 on the carrier plate and the wheel and positions below the carrier plate in which the studs are withdrawn from the bolt holes. From this latter position, each element can be pivoted in its mounting on the carrier plate by means of a handle 28 attached to the upper end of the long limb of the element to a position as shown in FIGS. 5 and 6 in which the wheel can pivot downwardly (or upwardly) about the fixed hook without fouling the short limbs and web of the element.

To facilitate the engagement of each short limb into bolt holes 24 and 25 compression springs 29 are mounted between the carrier plate 13 and the handles 28 and urge the short limbs upwardly. This allows each short limb to be engaged in a bolt hole 25 of the wheel when the latter is in the hooked position and permits the wheel to be manipulated until, when the bolt holes in the wheel and the carrier plate are aligned, the short limbs are forced through to allow nuts 30 to be screwed onto them. Thus the wheel carrier comprises a body or carrier plate 13 on one side of which are located the two hook members 15 and 16 and the webs of the U-shaped elements whereas the handle 17 of the movable hook member 16 and the operating handles 28 of the U-shaped elements are operable from the other side of the plate.

It is considered that this invention has three important features. Firstly, because the movable hook 16 moves in a straight line and is spring biased, it ensures a very positive engagement with the rim of the opening in the wheel. Secondly, the provision of the handle 17 on the movable hook enables the user to manipulate the movable hook 16 in the event of it either not engaging or not disengaging the rim of the opening in the wheel. Thirdly, the fact that the handles 17 (on the movable hook 16) and 28 (on the brackets 27) are operable from above the plate 13 means that the risk of injury to the user during mounting or removal of the wheel is negligible.

We claim:

1. A vehicle spare wheel carrier comprising a body having means whereby it can be mounted in a suitable position on the chassis of a vehicle, a fixed hook member on the body, a movable hook member on the body guided for rectilinear movement towards and away from the fixed hook member, spring means biasing the movable hook member away from the fixed hook member, handle means on the movable hook member terminating at a point remote from the movable hook member, the two hook members being so located that the periphery of the central opening of a vehicle wheel can be engaged with the fixed hook member and the wheel can then be pivoted above the fixed hook member until the periphery of the central opening of the wheel is engaged by the movable hook member and additional locking means on said body for lockably engaging a bolt hole in the wheel when said wheel is engaged by both hook members, said additional locking means comprising at least one U-shaped element mounted on the body and comprising one long limb, one short limb and a web connecting the long limb to the short limb, each limb having a free end, the long limb including an operating handle on its free end and passing through a first opening in the body in movable fashion such that the U-shaped element may be manipulated by the operating handle to a position allowing the wheel to be positioned on the body without interference with any part of the U-shaped element, said U-shaped element being adapted to be manipulated by the operating handle when the wheel is in position on the body until the short limb passes through the bolt hole in the wheel and through a second opening in the body to hold the wheel in position on the body.

2. A spare wheel carrier as claimed in claim 1 in which the free end of the short limb is threaded to receive a locking nut.

3. A spare wheel carrier as claimed in claim 1 in which the body comprises a plate on one side of which are located the two hook members and the web of the U-shaped element whereas the handle means of the movable hook member and the operating handle of the U-shaped element are operable from the other side of the plate.

4. A spare wheel carrier as claimed in claim 1 including spring means on the long limb between the operating handle and the body to bias the short limb into engagement with the second opening.

* * * * *